United States Patent [19]

Rijkse et al.

[11] Patent Number: 5,932,657

[45] Date of Patent: Aug. 3, 1999

[54] POWDER PRIMER OF THERMOSETTING BINDER AND PVDF-COMPATIBLE THERMOPLASTIC

[75] Inventors: Ludwig Karl Rijkse, Haarlm; Willem Sietses, Uithoorn, both of Netherlands; Michel Gillard, Corroy-le-Chateau, Belgium

[73] Assignee: Fina Research, S. A., Feluy, Belgium

[21] Appl. No.: 08/278,354

[22] Filed: Jul. 21, 1994

Related U.S. Application Data

[63] Continuation of application No. 07/541,870, Jun. 21, 1990, abandoned.

[51] Int. Cl.$^6$ .............................. C08K 3/22; C08L 63/02; C08L 67/02
[52] U.S. Cl. .................. 525/108; 428/416; 523/459; 525/111; 525/113; 525/119; 525/121; 525/123; 525/125
[58] Field of Search ...................... 525/113, 119, 525/121, 131, 108, 111, 123, 125; 428/416; 523/459

[56] References Cited

U.S. PATENT DOCUMENTS

| | | | |
|---|---|---|---|
| 3,770,848 | 11/1973 | Labana et al. ......................... | 525/121 |
| 3,819,560 | 6/1974 | Kehr ........................................ | 525/121 |
| 4,179,542 | 12/1979 | Christofas et al. ..................... | 523/439 |
| 4,770,939 | 9/1988 | Sietsess et al. ......................... | 524/447 |
| 4,879,345 | 11/1989 | Connelly et al. ....................... | 525/121 |

OTHER PUBLICATIONS

Detroit Society for Paint Technology, "Powder Coating: Why–How–When," Journal of Paint Technology, vol. 44, No. 565, Feb., 1972, pp. 30–37.

*Primary Examiner*—Robert E. Sellers
*Attorney, Agent, or Firm*—Michael J. Caddell; M. Norwood Cheairs

[57] ABSTRACT

Powder compositions comprising about 5–15 wt % of PVdF-compatible thermoplastic resin, about 50–90 wt % of a thermosetting binder system, about 0–35 wt % of pigments and about 0–3 wt % of leveling agent are disclosed which are particularly suitable for use as primers with a later application of a pigmented PVdF-based top coating. Preferred compositions are based on an epoxy system containing about 8 wt % of PVdF or acrylic thermoplastic resin, 5–25 wt % of pigments and 0.7–1 wt % of leveling agent.

16 Claims, No Drawings

POWDER PRIMER OF THERMOSETTING BINDER AND PVDF-COMPATIBLE THERMOPLASTIC

This is a request for filing a continuation application under 37 CFR 1.60, of pending prior application Ser. No. 07/541,870, filed on Jun. 21, 1990 of Rijkse, et al. for Powder Compositions for Primer Coatings Suitable for PVdF-Based Top Coatings, now abandoned.

CROSS REFERENCE TO RELATED APPLICATION

This application claims priority under 35 USC 119 of a previously filed foreign application which was filed as an International Application under the Patent Cooperation Treaty as Ser. No. PCT/BE89/00031; filed Jun. 22, 1989.

FIELD OF THE INVENTION

The present invention relates to powder compositions and their use as primer coatings. In particular, the present invention relates to powder compositions for primer coatings particularly useful with PVdF based [poly(vinylidene fluoride)] top coatings, without the need for using solvents.

The present invention also relates to a process for preparing powder compositions and to a process for coating a substrate with said compositions.

BACKGROUND OF THE INVENTION

PVdF is recognized as exhibiting valuable properties which make its use as a binding agent very desirable. It is stable towards aggressive chemicals; and it is thermally stable, dirt-repellent, scratch resistant, weather-resistant and is not readily broken down by UV radiation. The durability of PVdF is evidenced by its tough finish as well as its ability to resist crazing and chalking with changing weather conditions.

Because of these advantageous properties, PVdF-based coatings are known to be very useful as protective coatings for a variety of substrates, more particularly for building panels and other articles made from metal sheets intended for outdoor use. However, while PVdF-based compositions provide a very satisfactory topcoating, they adhere poorly to metal substrates and have less than satisfactory corrosion resistance. Thus, PVdF-based coatings usually need to be applied on a suitable primer coating, rather than directly to the metal, mainly for improving adhesion to the substrate but also in order to improve corrosion resistance of the substrate. This is particularly necessary with metal substrates such as steel and aluminum. For this reason, many different primer coating compositions have been formulated. The composition of the primer depends, among other factors, on the topcoat which will subsequently be applied to it.

As primer for PVdF topcoats, it has already been proposed to use compositions of an acrylic resin, an epoxy resin and an organosilicon or organoaluminum compound. However, these compositions require the use of compounds which are designed to improve the adhesion to the substrate and are therefore delicate to use.

European Patent Application EP-A-294755 discloses a PVdF-based liquid coating product, based on a solvent and a ternary polymer mixture of PVdF, a second polymer incompatible therewith, and a compatibilizer, which product is be used as topcoat without primer coating. However, the preferred choice of an epoxy resin as the incompatible polymer considerably reduces the weathering resistance of the resulting coating.

Although the known wet systems may give good results, environmental protection laws throughout the world, but mainly in the U.S.A. and Europe, are making it increasingly difficult to handle solvent-based coating systems. Further, the recovery of the solvent is a costly procedure. Still further, use of both a powder top coating and a wet primer system requires two separate sets of application equipment, thus increasing fixed costs. Accordingly, there is a significant need for solventless powder compositions for primer coatings.

However, it is difficult to find a primer composition for PVdF powder coatings that will yield a system having good properties. Accordingly, there is a significant need in the art for improved solvent-free primer coatings for PVdF-based powder coatings, said primer coatings being capable of adhering well to a metal substrate as well as having good intercoat adhesion with the PVdF-based topcoats, while providing good corrosion resistance to the substrate. Additionally, the primer itself must retain its integrity, i.e. neither craze nor deteriorate.

OBJECTS OF THE INVENTION

It is an object of the present invention to provide powder primer products.

It is another object of the present invention to provide powder primer products suitable for PVdF-based powder coating products.

It is yet another object of the present invention to provide a process of preparing such powder primer products, without the use of solvents at any step thereof.

Still another object of the invention is to provide a process for coating a substrate with a primer coating for PVdF-based topcoats.

SUMMARY OF THE INVENTION

Accordingly the present invention provides powder products, comprising (i) from about 5 to about 15% by weight, based on the total weight of the product, of one or more thermoplastic resins compatible with PVdF; and (ii) from about 50 to about 90% by weight, based on the total weight of the product, of a thermosetting binder system, preferably epoxy-based.

The present invention also provides the use of the powder products as primer coatings, more particularly as primer coatings for PVdF-based top coatings. The present invention further provides a substrate coated with the primer and a process for coating a substrate with a primer coating, said primer coating being suitable for later application of a pigmented PVdF-based top coating by applying a pigmented PVdF-based powder on said primer coating and subjecting it to a heat treatment, preferably at a temperature of about 160 to about 260° C., said process comprising the steps of:

(a) applying the primer powder on a substrate;
(b) subjecting the primer coating to a heat treatment, preferably at a temperature of about 160 to about 260° C.

DETAILED DESCRIPTION OF THE INVENTION

The following description is intended solely to further illustrate the invention but should not be considered limitative of the reasonable scope thereof.

The primer contains from about 5 to about 15 wt %, preferably about 8 wt %, of one or more thermoplastic resins compatible with PVdF, preferably selected form the group consisting of vinylidene fluoride polymers, compatible acrylic polymers, and mixtures thereof.

The amount of the compatible thermoplastic resin in the powder composition is that amount sufficient to improve the adhesion of the resulting primer coating with a PVdF-based top coating. If part of the thermosetting resin is compatible with PVdF, it is possible to use lower amounts of the compatible thermoplastic resin.

The compatibility of two polymer resins can be detected by any one of a wide variety of methods known in the art (see e.g. "Polymer Blends", D. R. Paul et al., Eds., 1978 and "Polymer-Polymer Miscibility", O. Olabisi et al., 1979, both from Academic Press, New York). However, one method is most commonly used, namely the determination of the glass transition temperature Tg; which determination may be carried out using several methods, including spectroscopy and calorimetry. Indeed, it is generally accepted that compatible blends are indicated by a single glass transition temperature.

The preferred method used by the Applicant is differential scanning calorimetry, better known as DSC. Polymer blends are obtained by vacuum (<10 Pa) removal of the solvent from a 3% solution in dimethylformamide, first at room temperature then at 100° C., before being slowly cooled to ambient temperature. DSC measurements are carried out using three successive cycles of heating at 20° C./min, maintaining at the maximum temperatures for 10 minutes, cooling at 20° C./min and maintaining at the minimum temperature also for 10 minutes. Tg is defined as the temperature corresponding to the inflection point at half the specific heat difference, Cp, observed with the transition during the second and third heating steps.

However, as a screening method, it is also possible to visually evaluate the compatibility by the clarity of a film cast from a homogeneous solution of the polymer mixture, the polymers being compatible if the film exhibits no heterogeneity under considerable magnification.

Numerous thermoplastic polymers are known in the art to be compatible with PVdF (see e.g. J. Polym. Sci., 27 B, 1195, 1989). However, the compatible thermoplastic resin is preferably selected from the group consisting of vinylidene fluoride polymers, compatible acrylic polymers, and mixtures thereof.

The vinylidene fluoride polymers which are preferably used in the compositions of the invention are not only the homopolymer of vinylidene fluoride (PVdF), but also the copolymers prepared from at least 90% by weight of vinylidene fluoride monomers. Suitable copolymers include those with fluorinated comonomers such as, for example, tetrafluoroethylene, trifluoroethylene, chlorotrifluoroethylene, hexafluoropropylene, vinylfluoride, and the like. However, the homopolymer is generally used.

The preferred vinylidene fluoride polymers are those having a weight average molecular weight in the range of about 10,000 to about 70,000, most preferably about 30,000 to about 50,000, a melting temperature of about 155 to about 170° C., a melt flow index (according to ASTM D 1238 (230 C/5kg)) of about 10 to about 50 g/10 min, most preferably about 10 to about 30 g/10 min, and a melt viscosity (according to ASTM D 3835) of about 600 to about 1200 Pa.s at 230° C., most preferably about 700 to about 1000 Pa.s.

The acrylic polymers preferably used in the invention are those derived from one or more monomers having the formula CH2=CR1—CO—O—R2, wherein R1 is selected from the group consisting of hydrogen and methyl, and R2 is an alkyl radical containing from one to four carbon atoms. More preferred acrylates for use in the invention are poly (methylmethacrylate) and copolymers of methyl methacrylate and ethyl acrylate. The most preferred acrylic resins are copolymers of about 70wt % of methyl methacrylate with about 30 wt % of ethyl acrylate which exhibit a viscosity of about 7 to about 17 P when in 40% solution in a solvent mixture which is a 95:5 by weight mixture of toluene and ethylene glycol methyl ether.

The powder products of the invention comprise from about 50 to about 90 wt % of a thermosetting binder system consisting essentially of a thermosetting resin. Thermosetting resins contain cross-linking sites and, upon the application of heat and in the present of an appropriate curing agent (if the nature of the cross-linking sites requires it), they cure to a final resin which is mechanically strong, resistant to chemical attack and adherent to the substrate. Such thermosetting resins are usually obtained by copolymerization of monomer units with a minor amount of comonomer units containing a cross-linking site. Such sites are usually reactive groups like hydroxy, carboxyl, amino and glycidyl groups, which may be cross-linked using a curing agent which is exemplified by polyisocyanate compounds (usually diisocyanates like isophorone diisocyanate, xylylene diisocyanate, or hexamethylene diisocyanate), dimers and trimers thereof, and blocked isocyanate compounds (blocked at the isocyanate group with a blocking agent such as epsilon-caprolactam, phenol, benzyl alcohol or methyl ethyl ketoxime).

If the thermosetting resin is not self-curing, a curing agent is required, the amount of which may vary over a considerable range, depending on the particular type of curing agent selected and on the degree of curing desired.

A wide choice of thermosetting binder systems, designed for use in powder coatings, is available. They are known in the art, so that a complete description is not required herein. However, mainly to meet the corrosion resistance requirements, it is preferable to use a system based on a solid epoxy resin with an appropriate curing agent.

Solid epoxy resins which are useful in the practice of this invention are exemplified by, but not limited to, resins produced by reacting epichlorhydrin and bisphenol A and having an epoxy equivalent weight of from about 400 to about 1800. Numerous other examples may be found in the prior art, e.g. in U.S. Pat. No. 4,255,553 or in "Handbook of Epoxy Resins" (Lee and Neville, 1967, McGraw-Hill).

The preferred curing agent for these epoxy resins is dicyandiamide (NC—N=C—(NH2)2) which provides coatings with suitable reactivity, excellent mechanical properties, and chemical and corrosion resistance. The preferred concentration range for dicyandiamide is from about 4% to about 10% by weight of the epoxy resin.

The powder coating composition of the present invention can be mixed according to need with the various kinds of additives used in conventional coating compositions. Examples of the additives which can be compounded with the inventive powder coating composition include pigments, extenders, leveling agents, ultraviolet absorbers, thermal aging retarders and so on. These additives can be used either singly or in combination.

The compositions of the invention contain from 0 to about 35 wt % pigments. The use of pigments in the coating composition of the present invention is optional. If no pigment is used, this result in clear coat compositions; no visual control will be available when applying such clear coat manually, and the coating thus obtained may be unevenly thick.

When pigments are used, any pigment or combination of pigments can be used, for example, titanium dioxide, provided they are resistant to the subsequent heat treatments. The powder composition preferably contains from about 5 to about 25 wt % pigments.

The powder composition may optionally contain up to about 3 wt % leveling agent. Although a leveling agent is not essential to the invention, it helps obtain the high quality of coating surface required by some users. The amount of leveling agent can vary widely from about 0 to about 3 wt % based on the total weight of the mixture, but the amount preferably used is about 0.7 to about 1 wt % based on the total weight of the mixture.

Extruding and granulating (pelletizing) the resulting mixture can be conducted following standard procedures. The operating procedures and conditions are easily determined by one skilled in that art. The processing temperature is preferably from about 90° C. to about 140° C. with about 100° C. being most preferred. The dimensions of the pellets are not critical, however the pellets are usually about 3 mm in diameter and 2 mm in length.

In one embodiment of the invention, a master-batch is first prepared with the PVdF-compatible thermoplastic resin and the thermosetting binder resin in a weight ratio of from about 1:1 to about 1:4; which is then extruded with the remainder of the components.

Grinding the pellets may be accomplished by any means which allows suitable particles to be obtained. The resulting powder should comprise particles of size and shape suitable for achieving constant flow through the application equipment, mainly in order to obtain a constant thickness of the coating. It is preferred that the shape of the particles be as spherical as possible, because the resulting powder has better flow properties with spherical particles. For controlling particle size, the grinding step, if needed, may be combined with a sieving step for eliminating the largest size particles, i.e. those particles exceeding about three times the desired thickness of the coating.

On the other hand, excessively small particles (i.e. <1.5 um, wherein urn stands for micrometer) are to be avoided, because they are a health hazard and tend to block the transport lines during application. Accordingly it is preferred that the particles of the ground primer powder have an average particle size between about 0.03 and about 0.05 mm.

The grinding step is preferably carried out at room temperature, or at least at a temperature higher than about +50° C. Compositions containing high amounts of thermoplastic resin should be ground at lower temperatures, i.e. below about +20° C.

It is envisioned according to the present invention that a particularly useful grinding process would be any process of grinding that includes the removal of ground particles below a predetermined minimum size (to avoid over-grinding), and the retention of particles larger than a predetermined maximum diameter for further grinding.

The resulting powder can be applied to the substrate by any means suitable for achieving an even distribution thereon. In particular, the powder can be applied by any electrostatic spray application apparatus, whereby the charged particles are sprayed onto the oppositely charged substrate. Alternative application techniques include, for example, cloud chamber, fluidized bed, and even in some cases triboelectric coating, and the like. Such techniques are well known in the art and need not be described further.

After the powder has been applied to the substrate, it must be subjected to a heat treatment at a temperature sufficient to melt and cross-link at least a portion thereof. The heat treatment preferably comprises passing the coated substrate into a heated oven wherein the coating is finally baked at a temperature of about 160° C to about 260° C. The temperature used in this step should be higher than the melting point of the powder, which melting point is easily determined experimentally.

On the other hand, excessively high temperatures have an adverse effect on most properties of the primer coating. The duration of the heating step is easily determined by one skilled in the art, using known suitable methods.

After cooling of the primer coating, the top coating composition is applied thereon and subjected to a suitable second heat treatment which should however not exceed about 260° C.

Although the coating compositions of the invention are particularly adapted as primers for PVdF-based powder topcoatings, they may also be used in combination with other powder topcoatings or even with liquid (i.e. solvent-based) topcoatings.

In order to further illustrate the invention, the following examples are given which are not intended to limit the scope of the invention.

EXAMPLES

In all the following examples, all values are in percentages by weight, except where otherwise stated, and the following definitions apply:

Dicyandiamide designates a commercially available dicyandiamide-type curing agent sold under the name EPIKURE 107 FF by SHELL OIL COMPANY.

Solid epoxy resin E designates a commercially available epoxide resin, preferably manufactured from bisphenol A and epichlorhydrin, having an epoxy molar mass (weight per epoxide equivalent) of about 775 g and a melting point of about 65° C. (sold under the name EPIKOTE 3003 by SHELL OIL COMPANY; similar products are available from other manufacturers).

Leveling agent M designates MODAFLOW POWDER III sold by MONSANTO CORP. Master batches were prepared by one of the following two procedures (a) or (b) to contain 70 wt % (as verified by a determination of the epoxy number) of solid epoxy resin E and 30 wt % of either a PVdF-compatible resin C or, for comparative purposes only, a non-compatible resin Z.

a) Melting the two resins together while mbdng them, cooling the mixture and granulating the resulting solid. The following master batches were prepared according to this procedure:

Master batch A containing as resin C a commercially available thermoplastic methylmethacrylate polymer sold under the name PARALOID A-21 by ROHM AND HAAS and having a Tg of 105° C.

Master batch B containing as resin C a commercially available thermoplastic copolymer of methyl methacrylate with ethyl acrylate sold under the name PARALOID B-44 by ROHM AND HAAS and having a Tg of 60° C.

b) Extruding the two resins together. The following master batches were prepared by this procedure:

Master batch K containing as resin C a commercially available thermoplastic vinylidene fluoride polymer having a melting temperature (according to ASTM D 3418) of 165–170° C. and a melt viscosity (according to ASTM D 3835) of about 700 Pa.s, sold under the name KYNAR 710 by PENNWALT CORPORATION. The extrusion was carried out in a co-rotating twin-screw extruder having a screw diameter of 28 mm and a length/diameter ratio of 30, operated at 50 rpm and giving an output of about 1 kg/h. The temperature profile during extrusion of this master batch was 20/20/20/70/180/200/200° C., the last temperature being the die temperature.

Master batch L containing as resin Z a commercially available thermoplastic ethylene vinyl alcohol (EVOH) copolymer (m.p. 105–108° C.) sold under the name LEVASINT S 31 by BAYER. The extrusion was carried out in a co-rotating twin-screw extruder having a screw diameter of 28 mm and a length/diameter ratio of 30, operated at 50 rpm and giving an output of about 1 kg/h. The temperature profile during extrusion of this master batch was 20/20/50/120/120/120/110 C, care being taken not to exceed 50 C in the third zone.

Master batch P containing PARALOID B-44 (hereinabove described) as resin C. The extrusion was carried out in a single screw extruder having a screw diameter of 45 mm and a length/diameter ratio of 30, operated at 70 rpm and giving an output of about 9 kg/h. The temperature profile was 20/130/150/150/160/130° C.

Grinding. application and topcoating

The pelletized primer compositions were ground in a RETSCH laboratory grinding unit before passing through a 0.12 mm sieve. The resulting powders were applied by an electrostatic spray process on a 2mm thick chromated aluminum plate, heated 10 minutes at 180 C (object temperature) to give a 50 um primer coating and topcoated by a 50 um PVdF-based powder coating as described in Example 1 of Ep-A-259290.

Testing Procedure for evaluation of the filiform corrosion resistance

During a period of 12 weeks (2000 hours), the test material which had been scratched vertically through the coating to the bare metal (according to ASTM D1654), was placed in a controlled environment where temperature and relative humidity were varied independently. Corrosive conditions were made more aggressive by introducing an intermittent salt spray, alternating with acidification of the climate by a continuous dosage of sulphur dioxide (SO2) gas at a concentration of about 100 ppm based on the following 24 hour cycle:

1 hour at 30° C. and 96% relative humidity
1 hour salt spraying at 30° C. with a 5% w/w NaCl solution
3 hours at 30° C. and 96% relative humidity
1 hour salt spraying at 30° C. with a 5% w/w NaCl solution
1 hour at 30° C. and 96% relative humidity
14 hours at 30° C. and 80% relative humidity
3 hours at 70° C. and 40% relative humidity.

At the end of the 12 week period, the test panels were evaluated for creepage from the scratches (scribe).

Examples 1 and 2

Primer paints containing 8 wt % of PVdF-compatible resin were prepared by extruding and granulating the following ingredients:

|  | Ex. 1 | Ex. 2 |
| --- | --- | --- |
| Solid epoxide resin E | 52.45 | 52.45 |
| Dicyandiamide | 3.75 | 3.75 |
| Master batch B | 26.7 | — |
| Master batch P | — | 26.7 |
| Leveling agent M | 0.8 | 0.8 |
| Titanium dioxide | 16.3 | 16.3 |
|  | 100.0 | 100.0 |

The properties of the coating systems were determined to be almost identical and equal to:
1) Reverse impact resistance according to ASTM D 2794 or ECCA-T5: 4 N.m (Ex. 1) and 3 N.m (Ex 2)
2) Adherence: Gt 0, according to ISO 2409 (optimum value on a scale from 0 to 4)
3) Filiform corrosion: After 2000 hours, less than 0.5 mm along 5% of the scratch Example 3

A primer paint was prepared with the following composition:

71.15 p.b.w. (percentage by weight) of solid epoxy resin E
8.0 p.b.w. of PARALOID B-44
0.8 p.b.w. of leveling agent M
163 p.b.w. of titanium dioxide
3.75 p.b.w. of dicyandiamide
100.0

The preparation method used consisted in first mixing all powdered ingredients, except dicyandiamide, in a Herfelt mixer (dry mixing at room temperature). The resulting mixture was then extruded with the dicyandiamide in a co-rotating twin-screw extruder having a screw diameter of 28 mm and a length/diameter ratio of 30, operated at 50 rpm and giving an output of about 1 kg/h. The temperature profile during extrusion was 20/95/95/95/95/90/100° C., the latter temperature being the die temperature and the dicyandiamide being injected along the screws at the beginning of the 90° C. zone so that its residence time was less than one minute.

The properties of the coating system were determined to be:
1) Reverse impact resistance—2 N.m
2) Adherence—Gt O Examples 4–7

Primer paints were prepared by extruding the following ingredients according to the procedure of Example 3:

|  | Ex. 4 | Ex. 5 | Ex. 6 | Ex. 7 |
| --- | --- | --- | --- | --- |
| Solid epoxy resin E (% by weight) | 75.9 | 69.2 | 59.7 | 50.2 |
| PARALOID B-44 | 3.0 | 10.0 | 20.0 | 30.0 |
| Leveling agent M | 0.8 | 0.8 | 0.8 | 0.8 |
| Titanium dioxide | 16.3 | 16.3 | 16.3 | 16.3 |
| Dicyandiamide | 4.0 | 3.7 | 3.2 | 2.7 |
|  | 100.0 | 100.0 | 100.0 | 100.0 |

The coating system of Example 4 contains less than the desired amount of resin C and shows very bad intercoat (between the primer and the PVdF-topcoat) adhesion. The properties of the coating of Example 5 are similar to those of Example 3. The pellets of Examples 6 and 7, containing more than the desired amount of resin C, were cryogenically ground (according to a procedure similar to that described in Example 1 of EP-A-259290); and after spraying on an aluminum panel and heating as before, the resulting coating systems showed a low flexibility (<a N.m) but had good intercoat adhesion.

Examples 8

A primer paint was prepared by extruding and granulating the following ingredients:

52.45 p.b.w. of solid epoxy resin E 3.75 p.b.w. of Epikure 108 FF (dicyandiamide-type curing agent)

26.7 pb.w. of master batch P 0.8 p.b.w. of leveling agent M 16.8 p.b.w. of titanium dioxide 100.0

The coating system had the same properties as in Example 2 except the reverse impact resistance which was about 2.5 N.m.

Example 9

A primer was prepared by extruding and granulating the following ingredients:

16.4 pb.w. of solid epoxy resin E 39.5 p.b.w. of a carboxy-functional polyester resin (sold under the name GRILESTA P 7205 by EMS Chemie) as curing agent 33.0 p.b.w. of master batch B 0.8 p.b.w. of leveling agent M 163 p.b.w. titanium dioxide 100.0

The coating system showed a good intercoat adhesion, withstood a reverse impact of 1.5 N.m but its filiform corrosion resistance was slightly lower than that observed in Examples 1 and 2. This example shows that other curing agents can be used for the epoxy resin.

Examples 10 and 11 and Comparative Example 12

Primer paints were prepared by extruding and granulating the following ingredients:

|  | Ex. 10 | Ex. 11 | Ex. 12 |
| --- | --- | --- | --- |
| Solid epoxy resin E | 52.45 | 52.45 | 52.45 |
| Dicyandiamide | 3.75 | 3.75 | 3.75 |
| Master batch A | 26.7 | — | — |
| Master batch K | — | 26.7 | — |
| Master batch L | — | — | 26.7 |
| Leveling agent M | 0.8 | 0.8 | 0.8 |
| Titanium dioxide | 16.3 | 16.3 | 16.3 |
|  | 100.0 | 100.0 | 100.0 |

The primers of Examples 10 and 11 showed excellent intercoat adhesion with the PVdF topcoat; these coating systems withstood a reverse impact of 2 N.m. The primer coating of Example 11 had however a bad appearance before application of the PVDF topcoat. The coating system of Comparative Example 12 utilizing a non-compatible resin Z in the master coating system of Comparative Example 12 utilizing a non-compatible resin Z in the master batch, had strong mechanical properties (reverse impact : 3 N.m) but showed very poor intercoat adhesion between the primer and the PVDF topcoat.

Example 13

A primer paint was prepared by extruding and granulating the following ingredients:

| | |
| --- | --- |
| 34.17 | p.b.w. of a hydroxy-functional polyester (hydroxyl content of about 1.5%, sold under the name CRELAN U 502 by BAYER) |
| 17.23 | p.b.w. of a polyfunctional cycloaliphatic diisocyanate adduct blocked with epsilon-caprolactam sold under the name CRELAN U 12 by BAYER and having a NCO content of about 10.5% |
| 25. | p.b.w. of a master batch prepared by melting together 70 wt % of CRELAN U 502 and 30 wt % of PARALOID B-44 0.8 p.b.w. of leveling agent M |
| 22.8 | p.b.w. of titanium dioxide |
| 100.0 | |

The coating system showed good intercoat adhesion, withstood a reverse impact of about 1 N.m but had a bad filiform corrosion resistance. This sample shows that a primer paint can also be formulated from other thermosetting binders than of the epoxy type: in this example an isocyanate-cured polyester was used instead of dicyandiamide-cured epoxy resin used in the previous Examples. However, the anti-corrosive properties were not entirely satisfactory.

What is claimed is:

1. A powder composition useful as a primer coating for PVDF topcoating, said composition comprising:
   (i) from about 5 to about 10% by weight, based on the total weight of the composition, of one or more thermoplastic resins compatible with PVDF comprising an acrylic polymer, and
   (ii) from about 50 to about 90% by weight, based on the total weight of the composition, of a thermosetting binder system.

2. The powder composition of claim 1, wherein the thermosetting binder system comprises a solid epoxy resin with a agent.

3. The powder composition of claim 1, containing up to about 35 wt % pigments.

4. The powder composition of claim 1, containing from about 5 to about 25 wt % pigments.

5. The powder composition of claim 1, containing up to about 3 wt % leveling agent.

6. The powder composition of claim 5, containing from about 0.7 to about 1 wt % leveling agent.

7. The powder composition of claim 2, wherein said epoxy resin has been produced by the reaction of epichlorhydrin and bisphenol A and has an epoxy equivalent weight of from about 400 to about 1800.

8. The powder composition of claim 2, wherein said curing agent is a dicyandiamide.

9. The powder composition of claim 8, wherein said dicyandiamide is used in an amount of from about 4% to about 10% by weight of the epoxy resin.

10. The powder composition of claim 9, wherein said thermoplastic resin compatible with PVdF is used in an amount of about 8% by weight of the total composition.

11. The powder composition of claim 9, wherein the thermoplastic resin compatible with PVdF is selected from the group consisting of vinylidene fluoride polymers, acrylic polymers, and mixtures thereof.

12. The powder composition of claim 11, wherein the vinylidene fluoride polymers are homopolymers or copolymers prepared from at least 90 wt % of vinylidene fluoride monomers.

13. The powder composition of claim 12, wherein the vinylidene fluoride polymers have a weight average molecular weight of from about 30,000 to about 50,000, a melting temperature of about 155 to about 177° C, a melt flow index of from about 10 to about 30 g/10 minutes when measured according to ASTM-D-1238 (230 C/5 kg), and a melt viscosity of from about 700 to about 1000 Pa at 230° C. when measured according to ASTM-D-3835.

14. The powder composition of claim 11, wherein the acrylic polymers are derived from one or more monomers having the formula: $CH_2=CR_1-CO-O-R_2$ ($R_1$ being selected from the group consisting of hydrogen and methyl and $R_2$ being an alkyl radical containing from one to four carbon atoms).

15. The powder composition of claim 14, wherein the acrylic polymers are selected from the group consisting of poly(methylmethacrylate) and copolymers of methyl methacrylate and ethyl acrylate.

16. The powder composition of claim 14, wherein the acrylic polymers are copolymers of about 70 wt % of methyl methacrylate with about 30 wt % of ethyl acrylate, said copolymers exhibiting a viscosity of about 7 to about 17 P when in 40% solution in a solvent mixture which is a 95:5 by weight mixture of toluene and ethylene glycol methyl ester.

* * * * *